INVENTORS
George W. Brock
Hobart J. Merrifield

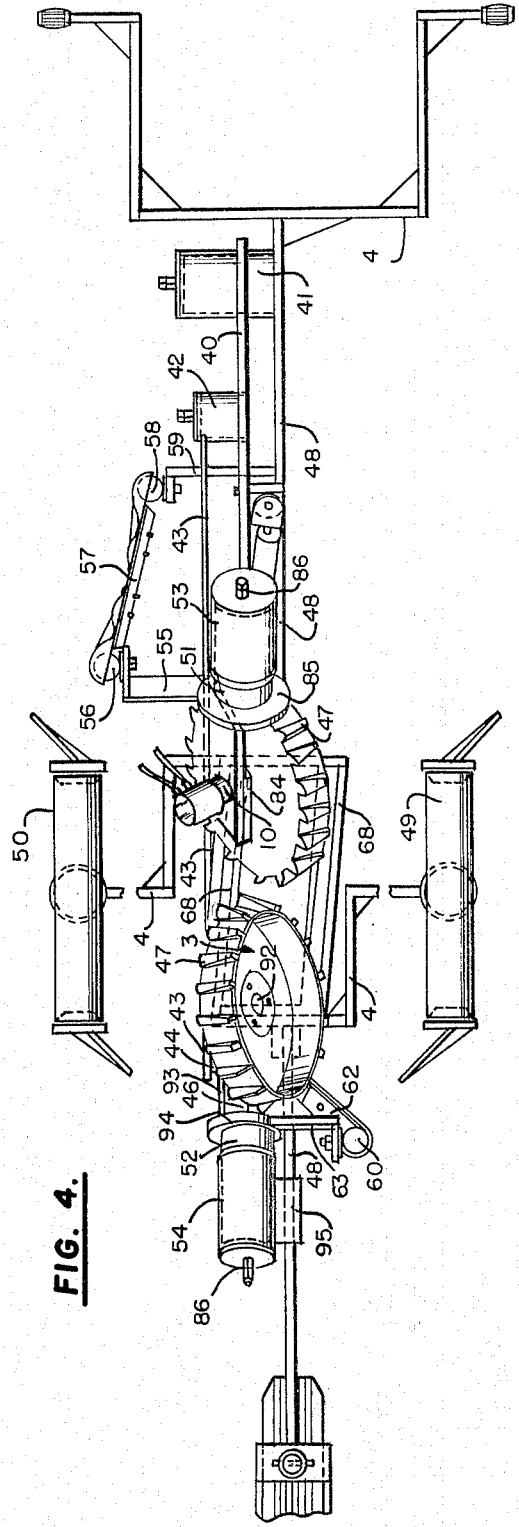

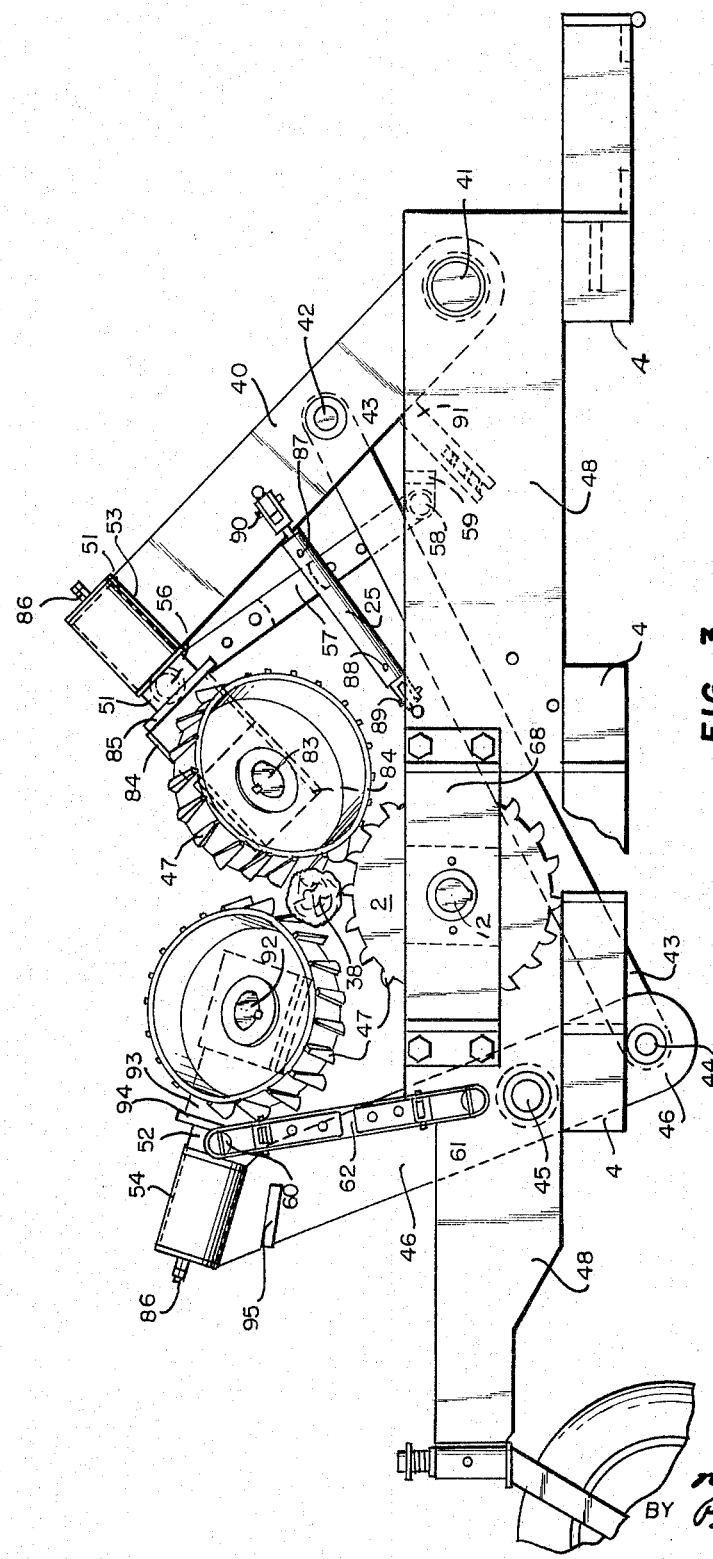

Aug. 2, 1966 G. W. BROCK ETAL 3,263,720
LOG DEBARKER
Filed Sept. 11, 1963 5 Sheets-Sheet 4
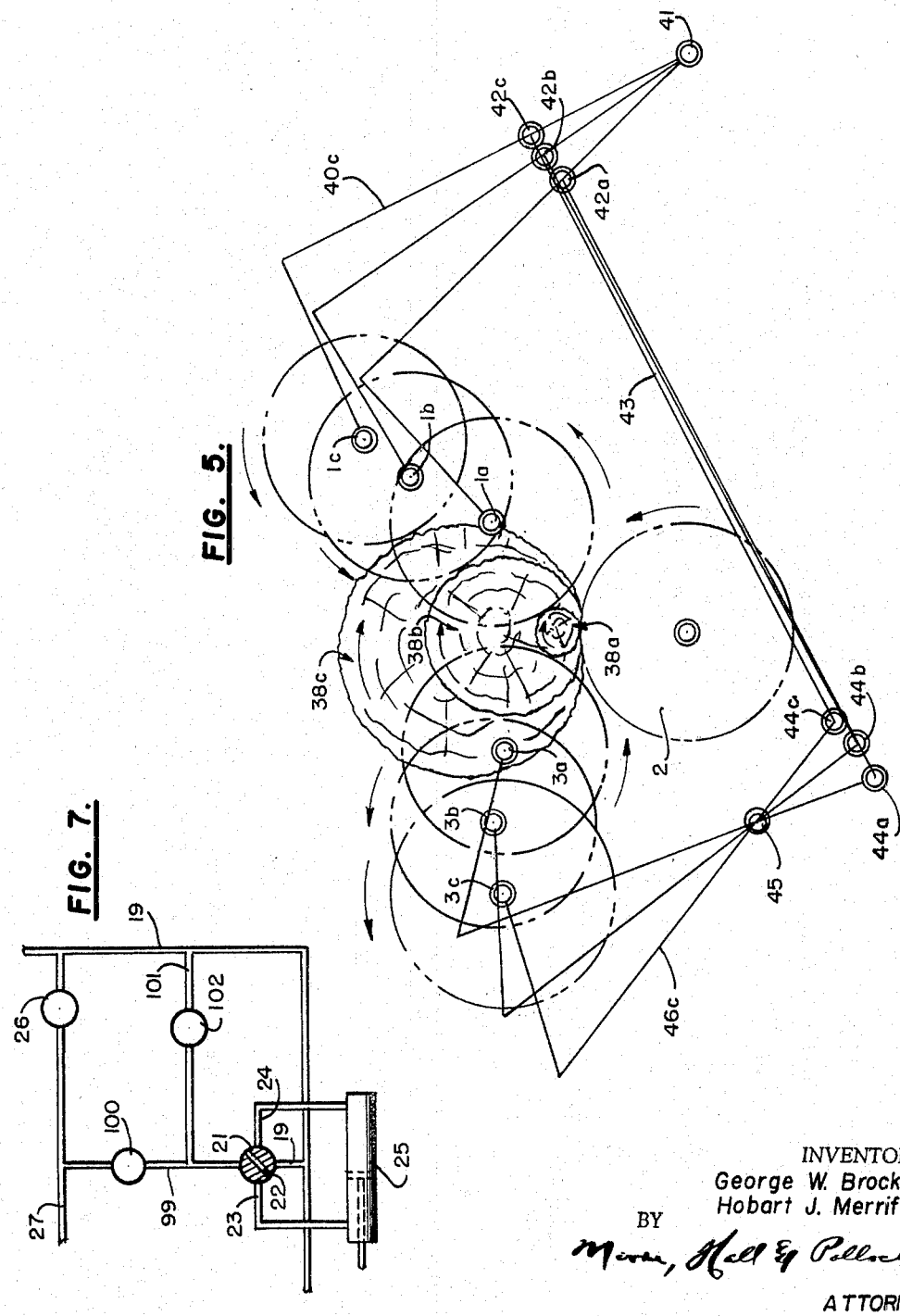
INVENTORS
George W. Brock
Hobart J. Merrifield
BY
ATTORNEYS Aug. 2, 1966
G. W. BROCK ETAL
3,263,720
LOG DEBARKER
Filed Sept. 11, 1963
5 Sheets-Sheet 5
FIG. 6.
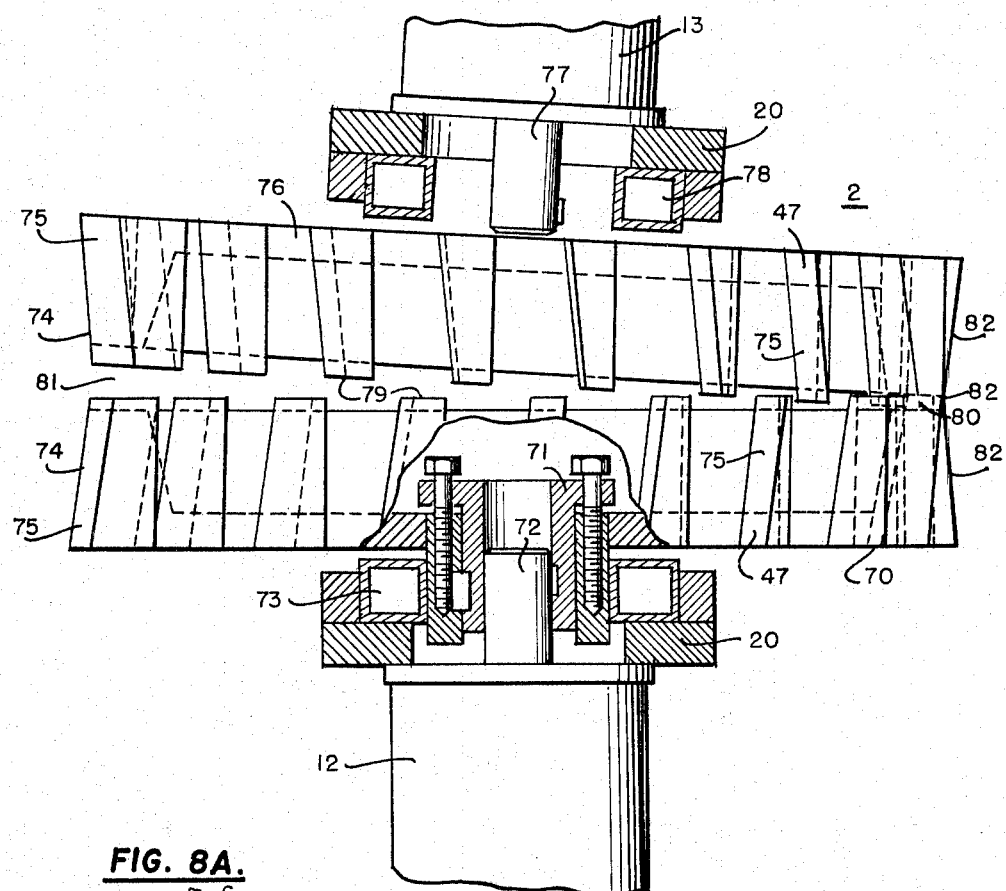
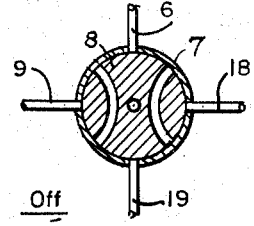
Off
FIG. 8A.
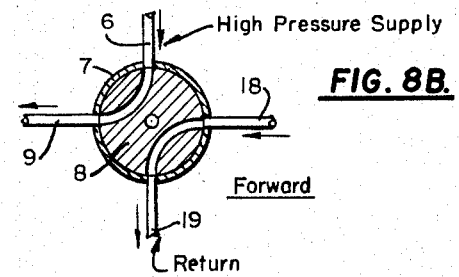
FIG. 8B.
Forward
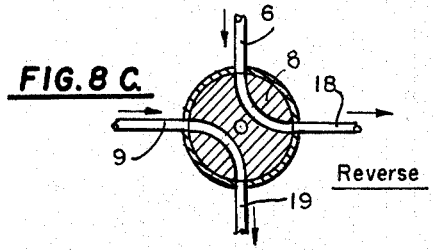
FIG. 8C.
Reverse
INVENTORS
George W. Brock
Hobart J. Merrifield
BY *Moore, Hall & Pollock*
ATTORNEYS

United States Patent Office 3,263,720
Patented August 2, 1966

3,263,720
LOG DEBARKER
George W. Brock, 10402 Kittrell St., Houston 34, Tex., and Hobart J. Merrifield, 608 Collins St., Ellisville, Tex.
Filed Sept. 11, 1963, Ser. No. 308,226
11 Claims. (Cl. 144—208)

The present invention concerns the removal of bark from logs of varying sizes and diameters by means of peeler wheels which are adjustable and driven independently of each other.

It is an object of the invention to provide a log debarker which has hydraulically driven peeler wheels which may be controlled independently and are normally driven at different speeds to provide a debarking differential speed between wheels.

It is an object of the invention to provide an improved hydraulic drive for a log debarker in which shock is readily absorbed and the individual peeler wheels may be stalled by knotty logs without damaging the machine or interfering with the operation of other peeler wheels.

It is an object of the invention to provide a log debarker in which logs can be peeled or debarked in either direction by using reversible hydraulic motors or mounting the peeler wheels on swivels to reverse the feed angle on the log.

It is an object of the invention to provide a log peeler or decorticator in which the peeler wheels automatically position themselves for different size logs. Where the pivot points of the debarker do not lie on the axis of any peeler wheel, the geometry provides the necessary leverage to position the peeler wheels automatically as they spread open for larger logs. The peeler wheels are thereby automatically repositioned in the vertical plane which provides an optimum spacing of the wheels around a log, permitting a better, surer grip on a log by the peeler wheels which are able to hold a log in position for treatment more easily.

It is an object of the invention to provide a log debarker in which the feed angle is change automatically for logs of different sizes, giving a variable rate of feed determined by log diameter, yielding total coverage for all size logs without over-peel which removes wood fibre. The linear advance of all size logs per revolution remains substantially the same, but with given speeds for the peeler wheels a larger diameter log requires a longer time because of the greater number of linear feet of the peeling helix.

It is an object of the invention to provide means for supporting pulp wood at two points for most of the peeling cycle so that crooked and knotty logs can be rotated and fed through the debarking apparatus with little or no binding.

It is an object of the invention to provide means for side ejection of logs when desired. An hydraulic cylinder is supplied to force the peeler wheels against the log. Reversal of the cylinder opens the peeling unit and allows a log to fall out. In this manner logs which are too crooked or which for some reason bind badly can easily be removed.

It is an object of the invention to provide peeler wheels with selected teeth positioned at an angle such that forces are produced along the longitudinal axis of the log acting in a direction opposite to the forward travel of the log. These forces tend to cause the forward feed of the log to be retarded until the bark has been removed after which the log is propelled along at an accelerated rate until the teeth again encounter bark. Those teeth are able to lift the bark off a log by getting under the bark and exerting an outward pull. Such action removes bark with less pressure on the peeler wheels than where the teeth strike against the bark and force it against and into a log. With this construction a log advances as soon as bark is removed and there is no injury to the peeled log by removal of wood fibre.

It is an object of the invention to debark logs of all sizes by means of a single unit machine free from flexible power transfer shafts connecting corresponding peeler heads of a plurality of peeling units in series.

According to the present invention bark is removed from logs by differentially rotating peeler wheels. Three wheels are spaced around a log so that it is held firmly by the blunt teeth around their circumferences. The three wheels are preferably driven at different speeds, giving rise to differential speeds between any two wheels and in particular, a differential speed between the periphery of a peeler wheel and the layer of bark on a rotating log. Once a log has entered the debarker more pressure is automatically applied to the peeler wheels which squeeze the log more tightly. The different speeds of the three wheels, the angularly positioned teeth and the pressure applied, all cooperate to provide a differential speed between the peeler teeth and the bark which gives a lifting action of the teeth, causing the bark to be removed by a combined lifting, shearing, rubbing action as the log rotates between the peeler wheels at a speed different from that of any of the three wheels. The peeler wheels are tilted slightly so that their axes are skew lines, giving a threading effect which advances a log through the case automatically. Each of the three peeler wheels has its own individual hydraulic motor which is supplied with liquid such as oil under pressure from an hydraulic pump connected to the power take-off of a tractor. Oil is supplied through suitable lines at sufficient pressure to provide enough torque to keep a log rotating and to remove the bark.

The design of the hydraulic system adds greatly to the flexibility of the apparatus. Not only may the speeds of the peeler wheels be varied independently, but the direction of rotation of any one or all three of the peeler wheels can be reversed. Varying the pressure in the cylinder which forces the wheels against a log regulates both the grip and the position of the peeler wheels.

It is an object of the invention to provide a log debarker which is readily transportable, permitting debarking at the logging site or at a remote point where bark disposal poses no problem, as is the case at a mill. The bark need not be transported, thus limiting the spread of plant diseases and parasites which may be present in the bark. The debarker is readily drawn by a farm tractor which also supplies power for the hydraulic system.

The several figures of the attached drawing are included as illustrative of one form of the invention and are not to be taken as limiting. Like numerals refer to like parts throughout the several figures.

FIGURE 2 is a schematic design for an hydraulic system for use with FIGURE 1.

FIGURE 3 is a view similar to FIGURE 1, but with parts removed to show construction and operation more clearly.

FIGURE 4 is a fragmentary plan view of FIGURE 3, with additional parts removed for clarity.

FIGURE 5 is a schematic elevation of part of a kinematic cyle of a debarking operation of the machine of FIGURE 1.

FIGURE 6 is a fragmentary plan view partially cut away to show bottom peeler wheels of FIGURE 1.

FIGURE 7 is a schematic design of a modification of the hydraulic system of FIGURE 2.

FIGURE 8A is a fragmentary schematic showing of valve 7 in "off" position.

FIGURE 8B is a fragmentary schematic showing of valve 7 in "forward" or drive position.

FIGURE 8C is a fragmentary schematic showing of valve 7 in "reverse" position.

Figure 1:
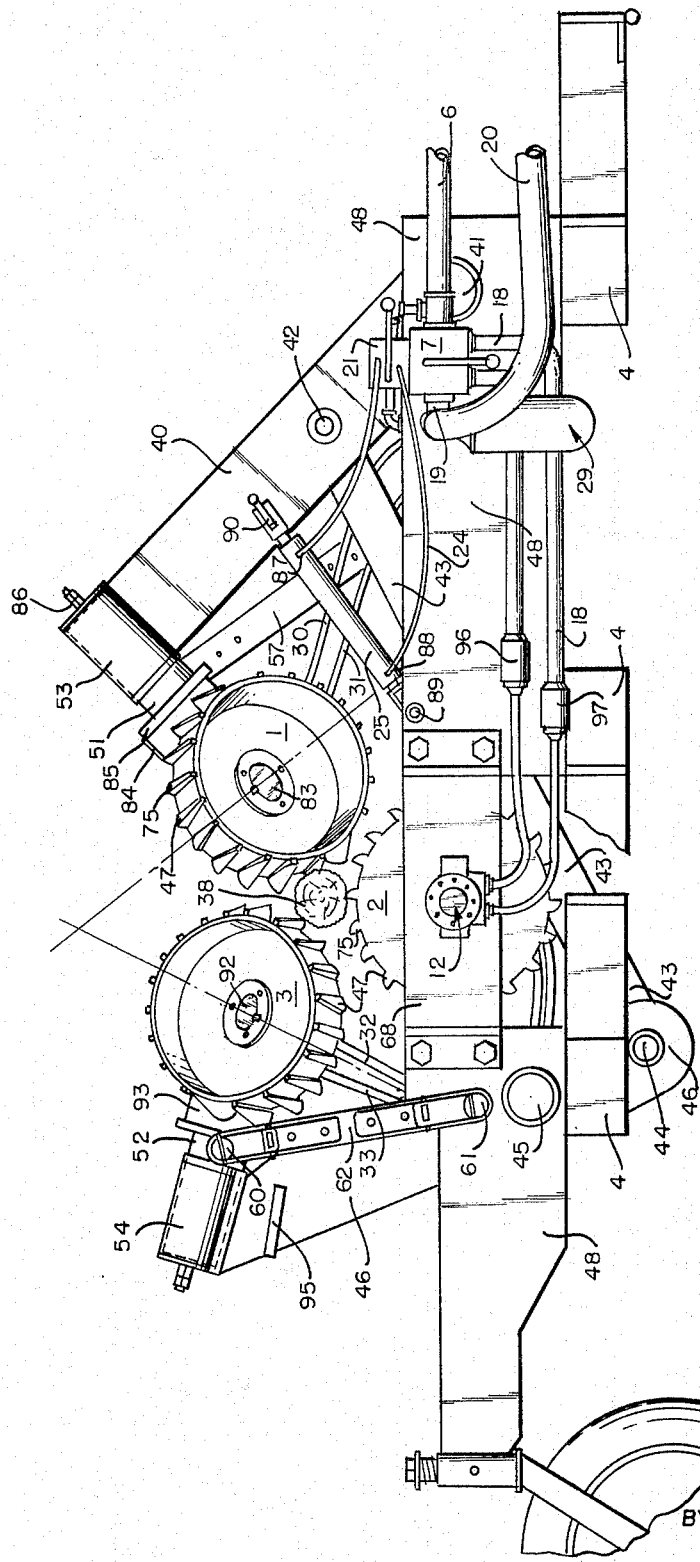
FIGURE 1 is a fragmentary front elevation of one form of debarking machine according to the invention.

A frame 4 of rigid construction is mounted on wheels to provide easy transportability. Frame 4 contains a debarking case 20 made up of frame members arranged in rectangular outlines and embraced by an enclosed parallelogram configuration. Right peeler wheel 1 is movably mounted above the right side of case 20 and left peeler wheel 3 is movably mounted above the left side. Bottom peeler wheel assembly 2 is mounted within the case 20 in fixed bearings mounted in its walls forming part of frame 4.

Bottom wheel assembly 2 comprises twin wheels shown in FIGURE 6. Driving wheel 70 is provided with a hollow hub 71 keyed to shaft 72 of hydraulic motor 12 and journaled in bearing 73 carried by casing 20 fixed to frame 4. Wheel 70 is conical and has a plurality of blunt teeth 47 mounted on its outer periphery. Teeth 47 are angularly inclined to the axis hub 71 and shaft 72. Teeth 47 have conical outer edges 74 and angularly disposed surfaces 75 which act to lift the bark during decortication. Driven bottom wheel 76 has a shaft 77 journaled in bearings 78 mounted in case 20 and fixed to frame 4. Wheel 76 may be driven by its own motor 13.

The axes of the shafts 72 and 77 intersect at a small angle or may be slightly skewed, so that the inner ends 79 of teeth 47 engage each other at the top as at 80 and wheel 70 drives wheel 76. Where motor 13 is used to drive wheel 76 interengagement at 80 of tooth ends 79 need not be relied upon to drive wheel 76. The ends 79 of the teeth 47 on the wheels 70 and 76 are spaced apart at the bottom as at 81, which allows bark to fall freely to the ground after removal from a log 38. The misalignment of shafts 70 and 76 increases the angularity of the tooth edges 74 at 82 where they engage a log 38 being treated and augment the lifting action referred to, which aids the removal of bark.

Peeler wheel 1 is rotatably mounted on the shaft 83 of hydraulic motor 10 carried by movable bracket 84 firmly attached to the flanged end 85 of shaft 51 rotatably mounted in sleeve 53. Sleeve 53 is firmly welded to the end of arm or bar 40 which is pivoted at 41 to member 48 of frame 4. Shaft 51 is held against reciprocation in sleeve 53 by lock nuts and stud 86 which are provided with a suitable washer to permit shaft 51 to rotate in sleeve 53. Arm 40 is rotated about fixed pivot 41 by means of double-acting hydraulic cylinder 25 which is provided with two fluid ports 87 and 88 which are connected respectively to hydraulic lines 23 and 24. Cylinder 25 has its outer shell pivoted to rigid bar 48 at 89 and its piston connecting rod assembly pivoted to lever arm 40 at 90. The application of hydraulic pressure to port 87 of cylinder 25 acts upon the piston to exert a force on lever 40 which tends to rotate it counterclockwise about pivot 41 and against the action spring biased cushioning stop 91 mounted on fixed bar 48. When cylinder 25 acts to rotate lever arm 40 in either direction linkage 57 acts to cause peeler wheel 1 and its mounting shaft 51 to rotate. Link 57 is pivotally mounted at one end on bracket bar 59 by ball joint 58. The other end of link 57 is connected by ball joint 56 to shaft 51 by bracket bar 55 which is welded to flange 85 and mounts ball joint 56.

Peeler wheel 3 is mounted on shaft 92 of hydraulic motor 11 which is mounted on bracket 93 carried by flanged end 94 of shaft 52 rotatably enclosed in sleeve 54. Sleeve 54 is welded to the upper end of lever 46 which is pivoted to fixed bar 48 at 45. The lower end of lever 46 is connected to lever arms 40 by link 43 and pivot 44, so that clockwise rotation of lever arm 40 about pivot 41 pulls link 43 to the right, rotating lever 46 counterclockwise about pivot 45. Over run is limited by engagement of the upper surface of bar 48 by stop 95 which projects from lever 46 below sleeve 54 and determines the largest diameter of log which can be treated. Rotation of lever 46 also produces rotation of shaft 52 and peeler wheel 3 through the action of link 62 which is connected at its upper end flange 94 of shaft 52 by ball joint 60 mounted on bracket 63 which extends from flange 94. The other end of link 62 is mounted on fixed bar 48 by ball joint 61.

Four-way hydraulic control valve 7 is connected to gear type hydraulic pump 5 by high pressure line 6. Pump 5 may be driven from the power take-off of the tractor used to transport the debarker, or by a separate gasoline or electric motor. Valve 7 is constructed to connect line 6 to line 9 and simultaneously to connect line 18 to return line 19 which conveys the liquid such as oil to filter 29 from which line 20 conveys the liquid to reservoir tank 28. Tank 28 supplies filtered oil to the intake of pump 5 through line 4.

Valve spool 8 of four-way valve 7 is constructed to isolate lines 6 and 9 from lines 18 and 19, having two independent channels which function simultaneously, one on the high pressure side and the other on the low pressure return side when the valve handle is placed in "forward" position. When spool 8 is in the "off" position line 6 and line 9 are both closed by the wall of spool 8. Lines 18 and 19 are also preferably closed in the same manner, so that the peeler wheels are locked when valve 7 is "off." It will be understood that spool 8 has a third or "reverse" position in which it connects line 6 to line 18, which then becomes the high pressure side and simultaneously connects line 9 to low pressure return line 19. These positions of spool 8 are illustrated schematically in the drawings. FIGURE 8A shows the "off" position, FIGURE 8B shows the "forward" position, and FIGURE 8C shows the "reverse" position of valve 7.

With spool 8 in the forward position of FIGURE 8B, high pressure flows from line 6 through line 9 through control valve 14, line 30, through fixed displacement hydraulic motor 10 which drives peeler wheel 1, line 31, through flow control valve 15 to low pressure line 18, and through spool 8 to return line 19. During operation peeler wheel 1 turns faster than a log 38 being decorticated and there is velocity differential between the periphery of peeler wheel 1 with its teeth 47 and the bark of the more slowly rotating log 38. Control valve 15 adjusts the rate of flow of liquid through motor 10 and thereby the speed or r.p.m. of the motor 10 and of peeler wheel 1 connected thereto. Any difference in pressure between supply line 9 and low pressure line 18 which is not required to drive motor 10 appears as a pressure drop across control valve 15 which acts to restrict fluid flow. Flow valve 14 allows free fluid flow through it with negligible pressure drop when spool 8 is in forward position and line 9 is a high pressure line.

High pressure fluid also flows from line 9 through control valve 16, line 32, hydraulic motor 11, line 33, control valve 17 and line 18 to spool 8 and return line 19. Control valve 17 is adjusted to limit the speed of motor 11 and peeler wheel 3 so that it rotates somewhat more slowly than the log 38 being treated so that there is a differential peripheral speed between the teeth 47 of wheel 3 and the bark of log 38. This differential speed acts to resist the rotation of log 38 and provides together with the differential speed of wheel 1, a highly effective decorticating action. If the differential speed of the periphery of peeler wheel 1 with respect to the bark on log 38 is regarded as having a positive value in the sense that the resultant clippage tends to speed up the rotation of log 38, the differential speed of the periphery of wheel 3 and its teeth 47 with respect to the bark on the log 38 may be regarded as having a negative value or braking action which tends to slow down the rotation of log 38. The resultant opposing forces are almost completely applied to the bark and are highly effective in its removal from the log 38. Here again, valve 16 allows free, unrestricted fluid flow from line 9 to motor 11 while control valve 17 throttles the fluid flow through motor 11. The pressure drop across valve 17 is substantially greater than across valve 15 during this phase of the operation.

The mechanically interlocked double wheels 70 and 76 of bottom peeler wheel assembly 2 are driven respectively by hydraulic motors 12 and 13 which are connected directly across lines 9 and 18 by lines 34, 35 and lines 36, 37, respectively. Motors 12 and 13 rotate at the same speed and normally the hydraulic fluid available to them is not sufficient to drive them faster than motor 10. It is preferred to have motors 12 and 13 run at a speed which is intermediate that of motors 10 and 11, assuming all three peeler wheels 1, 2 and 3 have the same effective diameter. In order to make certain that the above speed relation in fact exists, it may be desirable to place throttling valves 96 and 97 in lines 34, 35 and in lines 36, 37 as shown in FIGURE 1, in the event that line 9 is a header of substantially larger diameter than lines 30 and 32 with a resultant very small pressure drop between its junction with line 30 and its junction with lines 34 and 36.

As previously noted, pump 5 is shown as a gear type of fixed displacement with an output directly proportional to r.p.m. It follows that the flow rate of hydraulic liquid through lines 6 and 9 is a function of the speed of the driving motor and can be varied accordingly. With the hydraulic system shown in FIGURE 2, the speed of motors 12 and 13 can be set by adjusting the speed of the motor driving pump 5. Control valves 15 and 17 are then adjusted to provide desired differential peripheral wheel speeds discussed above.

A relief valve 26 is provided in line 27 which is connected to shunt fluid across the outlet of pump 5 at line 6 and the inlet to filter 29 at return line 19 in the event that a safe pressure level in line 6 is exceeded.

Reverse peeling

When it is desired to reverse the direction of rotation of the peeler wheels, valve spool 8 is rotated to the position shown in FIGURE 8C, which connects high pressure line 6 to line 18 and line 9 to return 19. The reversal in the pressure relations of lines 9 and 18 cause a reversal in the direction of rotation of motors 10–13, inclusive. Valves 14 and 15 exchange functions as do valves 16 and 17.

Controlled peeling

The gripping action of the teeth 47 of the peeler wheels on the bark of a log 38 is varied by hydraulic cylinder 25 which acts on lever arm 40 and lever 46 through link 43, as described above. Cylinder 25 has a double acting piston 39 and is provided with ports 87 and 88 to which lines 23 and 24 are connected respectively. Four-way valve 21, similar in construction and operation to valve 7, is connected to junction 98 with high pressure line 6 by line 99 and line 27. Valve 21 is connected to return line 19 and also to lines 23 and 24. Valve spool 22 has the same three operating positions as valve 7. When piston 39 is to be moved to the right to rotate lever arm 40 in a counterclockwise direction, spool 22 connects high pressure line 99 to line 23 and line 24 to return line 19. Where lever arm 40 is to be rotated clockwise to reduce the force exerted by the peeler wheels 1 and 3 on log 38, spool 22 is rotated to connect line 99 to line 24 and line 23 to return line 19, admitting high pressure oil to the right side of piston 39. When the force exerted by wheels 1 and 3 is at the desired value spool 22 may be turned to close both lines 23 and 24 and thereby lock piston 39, lever arm 40 and lever 46 in the position producing the desired force.

Automatic adjustment of gripping force applied by peeler wheels to work load Although the above provides the operator with overriding manual control, for many applications it is preferred to turn spool 22 to connect line 23 to line 99 to cause peeler wheels 1 and 3 to apply force through their teeth 47 to log 38 and to utilize the self-adjustment feature of the present system to adjust the gripping force applied to the peeling wheels 1, 2 and 3, so that it is proportional to the work resistance to the rotation of the peeler wheels. That is, the present invention is embodied in structure which utilizes the rate at which work is done, or energy is expended by the peeler wheels 1, 2 and 3 and their driving hydraulic motors 10–13 to adjust the force applied by the teeth 47 to remove the bark on log 38. When the amount of work required to remove bark decreases momentarily for any reason, the force exerted by cylinder 25, tending to press the teeth 47 into the bark, is decreased by a controlled and measured amount substantially instantaneously so that the teeth 47 do not dig into or abrade the wood fiber underlying the bark. On the other hand, when bark removal becomes momentarily difficult, requiring more force to remove the bark, cylinder 25 acts automatically to increase the force exerted by the lever arm 40, lever 46 and the teeth 47 on the bark. This result is obtained by utilizing the changes in static pressure head in line 6 to control the effective force exerted by cylinder 25 on lever arm 40.

With spool 22 turned to connect line 23 to line 99 and its junction point 98 with line 6, lever arm 40 is urged counterclockwise against the spring bias of cushioning element 91 which tends increasingly to urge lever arm 40 in a clockwise direction. Arm 40 continues to rotate counterclockwise under the pull of cylinder 25 until the counterclockwise movement about pivot 41 is balanced by the combined clockwise movements of bias member 91 and the reaction force exerted by the bark on the teeth 47 of both wheels 1 and 3. The reaction force exerted by the bark on the teeth 47 of wheel 3 is transmitted through lever 46, pivot 45 and link 43 to lever arm 40.

The force exerted by cylinder 25 is determined by the effective static pressure head of the hydraulic liquid within the cylinder 25 acting on piston 39. This static pressure at piston 39 has substantially the same value as the static pressure head at junction point 98.

Once output of pump 5 is stabilized by adjustment of the driving motor and assuming a constant load on motors 10–12, the static pressure in line 6 at a point such as 98 can be determined by the application of Bernoulli's law:

$$p/w + v^2/2g + Z = a\ constant$$

where $p$ is the static pressure in lbs./sq. ft.
$w$ is the specific weight of fluid in lbs./cu. ft.
$v$ is the velocity of flow in ft./sec.
$g$ is the acceleration of gravity in ft./sec.$^2$
$Z$ is potential head or elevation above a datum of the point under consideration in feet
$p/w$ is termed the pressure head
$v^2/2g$ is termed the velocity head
$Z$ is termed the potential head.

The effect of potential head $Z$ on the total pressure in the system is small and can be neglected. Also the velocity head $v^2/g$ can be neglected assuming lines 6, 9, etc. are large with respect to the quantity of fluid flowing through them.

Therefore, the force exerted by cylinder 25 on the teeth 47 is a function of the pressure in line 6 according to the formula $F = P/A$ where F represents the force in pounds exerted by cylinder 25 piston rod, P is the pressure in lbs./in.$^2$ acting on piston 39, A is the area, in.$^2$, of piston 39.

The pressure in line 6 is a function of the load on teeth 47. The pressure at the pump 5 output is normally not constant but varies according to the torque requirements on motors 10–13.

When the load on teeth 47 is heavy, motors 10–13 meet more resistance the static pressure within line 6 and at point 98 increases, as does the force exerted by cylinder 25 on the teeth 47 which are thereby caused to grip the bark harder to increase the decorticating action.

As the removal of bark becomes easier or there is no bark to remove, the dull rounded teeth 47 slip over the smooth surface of decorticated log 38, meeting little resistance. As the load on motors 10–13 falls off the static pressure falls off rapidly. As the static pressure within cylinder 25 decreases, so does the force exerted by the cylinder 25 on lever arm 40. Bias spring element 91 urges the lever arm 40 in a clockwise direction and the teeth 47 press with decreased force on the log 38. It is pointed out that the change in hydraulic pressure head is substantially instantaneous, the only delay in translating this change into a change in force exerted by the teeth 47 is caused by the inherent inertia of the peeler heads and the linkage mechanism.

With the above arrangement, a log is more easily introduced into the case 68 because the initial gripping force is low. The gripping force is reduced as soon as the bark is removed, thus preventing damage to the wood fiber of the log. Energy supplied by the engine is tied directly to the work load and varies with it.

Where greater control adjustment of the above automatic regulation of the force exerted by the teeth 47 is desired, the hydraulic system may be modified as shown in FIGURE 7, wherein a pressure regulator valve 100 is placed in line 99 and an additional by-pass line 101 with a relief valve 102 is supplied. Relief valves 26 and 102 act to by-pass fluid if pressure builds up too high due to stalling of all the motors 10–13, inclusive.

Again, valve 100 may be pressure reducing to control or limit the maximum force which cylinder 25 can exert on lever arms 40. That is, valve 100 can be constructed to reduce the pressure in line 99 to a constant pre-set value lower than the pressure at point 98. Relief valve 102 would then function in the event knots were encountered or the log 38 enlarged its diameter very rapidly, placing a demand for an abrupt movement of piston 39 due to an instantaneous static pressure build-up approaching maximum value under stalled conditions. This circuit can help prevent binding of a log in the machine.

*The operation of a debarker according to the present invention*

The engine driving pump 5 is started and its speed adjusted to drive the pump at what appears to be an optimum speed. Valve 7 is turned to "forward" position and valve 21 to "automatic" force exerting position. With motors 10–13 running idle, the engine speed is adjusted to give a suitable speed to wheel 2 based on experience. Valve 15 is adjusted so that motor 10 rotates wheel 1 faster than wheel 2 and valve 17 is adjusted so that motor 11 rotates wheel 3 more slowly than wheel 2. The amount of the differential speed need not be great to provide effective debarking action.

A log 38 is introduced to case 68 by placing one end on feeder bracket and roller 49 and advancing it between peeler wheels 1, 2 and 3 which are all rotating in the same direction. Peeler wheels 1 and 3 are tilted at an acute angle with respect to a plane perpendicular to the axis of log 38, which is substantially horizontal. As shown in FIGURE 4, for counterclockwise rotation, peeler wheel 1 is tilted so that the feed angle will advance a log 38 from bracket-roller 49 to bracket-roller 50. This action results from the differential peripheral speed of wheel 1 with respect to that of log 38, wheel 1 moving faster than log 38. Peeler wheel 3 is tilted at an angle to move log 38 also from bracket-roller 49 to bracket-roller 50. Although peeler wheel 3 is also moving counterclockwise, its differential speed with respect to log 38 is negative and its teeth 47 provide a braking action on the log because it is moving more slowly than log 38.

The linear feed rate of a log 38 across the case 68 from roller 49 to roller 50 is controlled by the feed angle of peeler wheels 1 and 3, the position of bottom peeler wheel assembly 2 being fixed. As will be seen from a comparison of the kinematic relations of the linkages in FIG. 5 for three different diameter logs 38A, 38B and 38C with the action of links 57 and 62 on shafts 51 and 52, respectively, the feed angle is automatically varied according to the diameter of the log being treated.

*Automatic position of peeler wheels for logs of different diameters to equalize load, provide even peeling and to hold log securely at all times.*

The smaller the diameter of the log 38 the greater the feed angle of wheels 1 and 3 and the faster the log rotates about its axis and advances along its axis across case 68 and bracket-rollers 49 and 50. This follows because the smaller the diameter of the log the smaller the area of bark to be removed and the less the time required to cover this smaller area at any given speed of the wheels 1 and 3.

From FIGURE 5 it can be seen that as log diameter increases from 38A to 38B to 38C, wheel 1 is moved outwardly to successive positons 1A, 1B and 1C, carrying with it lever arm 40 which rotates clockwise about pivot 41 to assume the successive positions shown. As lever arm 40 rotates clockwise, link 57 rotates about the center of ball joint 58 and being of fixed length it causes shaft 51 to rotate by the connection at ball joint 56 to decrease the feed angle of peeler wheel 3 progressively with respect to the logs of larger diameter such as 38B and 38C.

As lever arm 40 rotates about fixed point 41 it carries movable pivot 42 and link 43 with it, causing movable pivot at the lower end of lever 46 to assume the successive positions 44A, 44B and 44C and rotating lever 46 counterclockwise about fixed pivot 45 until stop 95 engages the top of fixed bar 48 carried by frame 4. As lever 46 rotates it causes peeler wheel 3 to assume successive positions 3A, 3B and 3C and to rotate simultaneously under the restraint of link 62 which rotates about fixed ball joint 61 and causes shaft 52 to rotate by the connection at ball joint 60.

*Linear feed rate of a log is automatically varied as an inverse function of log diameter*

The above arrangement controls the feed angle of peeler wheels 1 and 3 and thereby the linear rate of a long 38 in accordance with its diameter, which is one factor determining the size of the area to be decorticated. The smaller the log, the smaller the area to be debarked, therefore the greater the feed angle and the greater the linear feed rates. The larger the log, the larger the area to be debarked, the smaller the feed angle and the smaller the linear feed rate. This construction provides uniform peeling for all sizes of logs. The lengths of links 57 and 62 are adjustable to provide finer control and to assure complete coverage without digging into wood fibre.

From FIGURE 5 it will be seen that the locus of the points of contact of wheel 1 with different diameter logs is an upward arc about pivot 41 and the locus of the corresponding points of contact of wheel 3 is an arc which is flatter and rises more slowly. The contact point on line with peeler wheel assembly remains substantially stationary.

Should a log become stuck, or the machine stall, valve 7 can be moved to reverse position to back up the log for a fresh start. This action immediately decreases the force exerted by teeth 47 and the peeled part of the log is not damaged because of the bluntness of teeth 47. This action permits reverse peeling as well. Also, valve spool 21 may be rotated to reverse the action of cylinder 25 which opens up the wheels 1 and 3 and the entire peeling unit, allowing a log to fall out or be ejected sideways.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A single unit decorticating device comprising a plurality of rotary decorticating wheels positioned in inclined surrounding relation to an elongated object to be decorticated, said inclined wheels each being mounted at an angle to the major axis of said elongated object and being operative to rotate said object while decorticating said object, operator means for bodily moving at least a selected one of said wheels toward and away from the major axis of said object, means for automatically changing the angle of inclination of said selected wheel relative to the major axis of said object with changes in the bodily position of said selected wheel relative to the major axis of said object, and means for rotating a first one of said rotary wheels at a rate in excess of the rate of rotation of said object to be decorticated, and for rotating a second one of said rotary wheels at a rate less than the rate of rotation of said object to be decorticated, thereby to effect a differential between the peripheral velocity of said object and the peripheral velocities of each of said first and second wheels.

2. A log debarking apparatus comprising a pair of rotary decorticating wheels positioned adjacent a log to be decorticated and mounted respectively on a pair of axes of rotation inclined relative to the major axis of said log, driving means operative to effect rotation of said wheels at different rates of rotation from one another respectively thereby to provide differential movement between the periphery of said log and the peripheral surfaces of said wheels operative to effect rotation of said log about its major axis and also operative to effect feeding of said log along its said major axis past said pair of wheels, operator means for selectively varying the relative spacing between said pair of wheels whereby logs of differing diameters may be debarked, and means responsive to changes in the relative spacing between said pair of wheels for automatically changing the angles of inclination of said axes of rotation of said wheels relative to the major axis of said log thereby to change the feed rate of said logs with variations in the diameters of said logs.

3. A single unit decorticating device comprising a plurality of rotary peeler wheels positioned in surrounding relation to an elongated object to be decorticated, said peeler wheels being angularly mounted relative to the axis of said elongated object to be decorticated and in spaced relation to one another about the periphery of said object, driving means operative to effect rotation of said wheels at different rates of rotation respectively thereby to provide differential movement between the surfaces of said wheels and an object being decorticated, said driving means including independent drives for each of said decorticating members whereby the stalling of any one of said decorticating members during the decorticating of said object has no stalling effect on the rotary movement of any other one of said members, and common control means coupled to all of said independent drives for controlling and selectively reversing the direction of rotation of said drives.

4. The combination of claim 3 wherein said independent drives include fluid operated hydraulic motor means, said control means including valve means for selectively reversing the direction of fluid flow through said motor means.

5. The combination of claim 3 including fluid pressure operator means operative to vary the positions of said rotary peeler wheels relative to one another whereby said plurality of wheels may be positioned in surrounding relation to objects of differing diameters, and means for varying the fluid pressure exerted on said operator means with variations in the load exerted on said peeler wheels.

6. In a log debarking apparatus, peeler means comprising first, second and third rotary peeler wheels mounted for rotatable movement relative to a log to be debarked, drive means for rotating said peeler wheels, said peeler wheels being angularly spaced from one another relative to the longitudinal axis of a log to be debarked whereby said first, second and third wheels are positioned to engage three different locations on said log angularly spaced from one another about the axis of said log, supporting means for said peeler wheels, said supporting means including means mounting at least said first and second wheels for movement toward and away from one another, said last-named means comprising means responsive to the movement of either of said first and second wheels toward or away from a log being debarked for effecting a related movement of the other of said first and second wheels toward and away from said log, operator means for forcing said first and second peeler wheels in unison against a log to be debarked, and control means responsive to the resistance to bark removal encountered by said peeler means for controlling at least in part the force exerted by said peeler means on said log, said control means including means operative to increase said force in response to an increase in bark removal resistance and being operative to decrease said force in response to a decrease in bark removal resistance.

7. In a log debarking apparatus, peeler means comprising a plurality of rotary peeler wheels mounted adjacent the outer periphery of a log to be debarked, drive means for rotating said peeler wheels, operator means for forcing said peeler wheels toward and away from the longitudinal axis of a log to be debarked, and control means interconnecting said drive means and said operator means, said control means including means responsive to the resistance to bark removal encountered by said peeler means for automatically controlling said operator means to vary the force exerted on the sides of said log by said peeler means, whereby the force exerted by said peeler means is automatically varied with variations in the load on said peeler means thereby to increase the gripping force of said peeler wheels on the exterior of said log when the resistance to bark removal increases.

8. The combination of claim 7 wherein said drive means and said operator means each include fluid operated hydraulic means, said control means including means for varying the fluid pressure exerted on said hydraulic operator means upon variations in the fluid pressure adjacent said hydraulic drive means.

9. A log debarker comprising in combination, means for supporting a log to be debarked, a first peeler element mounted for rotation about a first axis, said first element comprising a pair of decorticating wheels mounted in skewed relation to one another at a fixed position adjacent said log supporting means for engagement with the periphery of a log to be debarked, a second peeler element mounted adjacent said supporting means for rotation about a second axis, said second element being mounted for bodily movement toward and away from said log supporting means for engaging logs of differing diameters in debarking relation, a third peeler element mounted adjacent said log supporting means for rotation about a third axis, said third element also being mounted for bodily movement toward and away from said log supporting means for engaging logs of differing diameters in debarking relation, said three peeler elements being positioned to engage a log at three different locations angularly spaced from one another around the periphery of said log, and linkage means interconnecting said second and third elements and operative upon movement of said second element toward and away from a log to effect a related movement of said third element toward and away from said log whereby said second and third elements move in unison toward and away from one another adjacent different angularly spaced peripheral locations of a log being debarked.

10. The combination set forth in claim 9 wherein said linkage means include operator means for applying a controlled force urging said interconnected second and third elements into debarking relation with a log being debarked.

11. The combination set forth in claim 9 including further linkage means responsive to bodily movement of said interconnected second and third elements relative to said log supporting means for varying the angle at which at least one of said second and third element engages the bark of a log supported by said supporting means, whereby the angle of said engagement is automatically varied with variations in the diameter of a log being debarked.

References Cited by the Examiner

UNITED STATES PATENTS

| | | | |
|---|---|---|---|
| 1,282,789 | 10/1918 | Fenn | 130—9.4 |
| 1,373,243 | 3/1921 | Hellstrom | 144—208 |
| 2,641,289 | 6/1953 | Merrifield | 144—208 |
| 2,642,068 | 6/1953 | Urschel | 130—9 |
| 2,749,707 | 6/1956 | Slomer | 144—3 |
| 2,769,468 | 11/1956 | Swanson | 144—208 |
| 2,780,252 | 2/1957 | Gyllenberg | 144—208 |
| 2,794,464 | 6/1957 | Meiklejohn | 144—208 |
| 3,016,074 | 1/1962 | Baker et al. | 144—208 |
| 3,203,426 | 8/1965 | Urschel | 144—208 X |

FOREIGN PATENTS

| | | |
|---|---|---|
| 121,038 | 3/1948 | Sweden. |

HAROLD D. WHITEHEAD, *Primary Examiner.*

WILLIAM W. DYER, JR., *Examiner.*